(12) United States Patent
Hirosawa

(10) Patent No.: US 11,563,729 B2
(45) Date of Patent: Jan. 24, 2023

(54) INFORMATION PROCESSING APPARATUS, INFORMATION PROCESSING SYSTEM, AND NON-TRANSITORY COMPUTER READABLE MEDIUM STORING PROGRAM

(71) Applicant: FUJIFILM Business Innovation Corp., Tokyo (JP)

(72) Inventor: Tsutomu Hirosawa, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 151 days.

(21) Appl. No.: 16/853,768

(22) Filed: Apr. 21, 2020

(65) Prior Publication Data
US 2021/0112048 A1 Apr. 15, 2021

(30) Foreign Application Priority Data
Oct. 9, 2019 (JP) .............................. JP2019-186125

(51) Int. Cl.
| | | |
|---|---|---|
| H04L 9/40 | (2022.01) | |
| H04W 12/06 | (2021.01) | |
| G06F 21/44 | (2013.01) | |
| G06F 21/31 | (2013.01) | |

(52) U.S. Cl.
CPC .......... *H04L 63/0815* (2013.01); *G06F 21/44* (2013.01); *H04L 63/0807* (2013.01); *H04L 63/10* (2013.01); *H04W 12/06* (2013.01); *G06F 21/31* (2013.01)

(58) Field of Classification Search
None
See application file for complete search history.

(56) References Cited

U.S. PATENT DOCUMENTS

| | | | | |
|---|---|---|---|---|
| 8,973,122 B2* | 3/2015 | Beck | ...................... | H04L 9/3226 |
| | | | | 713/169 |
| 9,185,108 B2* | 11/2015 | M'Raihi | .................. | G06F 21/33 |
| 9,397,980 B1* | 7/2016 | Chen | ....................... | G06F 21/33 |

(Continued)

FOREIGN PATENT DOCUMENTS

| | | |
|---|---|---|
| JP | 2015090620 | 5/2015 |
| JP | 2019053692 | 4/2019 |

OTHER PUBLICATIONS

Oracle "Oracle OAuth Service," Oracle White Paper, Mar. 2015, pp. 1-19 (Year: 2015).*

*Primary Examiner* — Luu T Pham
*Assistant Examiner* — James J Wilcox
(74) *Attorney, Agent, or Firm* — JCIPRNET

(57) ABSTRACT

An information processing apparatus includes a processor configured to request a management apparatus for user authentication to acquire second credential information that is used for acquiring first credential information that is used for a Web service, the second credential information indicating that a user has been authenticated, receive the second credential information transmitted from the management apparatus in a case where the user authentication is successful by the management apparatus, transmit the received second credential information to an authentication server, receive the first credential information transmitted from the authentication server in response to the transmission of the second credential information, and use the Web service by using the received first credential information.

3 Claims, 5 Drawing Sheets

(56) References Cited

U.S. PATENT DOCUMENTS

| | | | | |
|---|---|---|---|---|
| 9,563,761 B1* | 2/2017 | Ziraknejad | | H04L 63/0861 |
| 9,578,015 B2* | 2/2017 | Xu | | H04L 63/10 |
| 9,825,930 B2* | 11/2017 | Fu | | H04L 63/08 |
| 10,140,596 B2* | 11/2018 | Chua | | G06Q 20/40 |
| 10,178,081 B2 | 1/2019 | Tsurumi et al. | | |
| 10,250,580 B2* | 4/2019 | Bailey | | H04W 12/068 |
| 10,425,418 B2* | 9/2019 | Asai | | H04L 65/1069 |
| 10,789,392 B2* | 9/2020 | Kupiec | | H04L 63/10 |
| 10,824,476 B1* | 11/2020 | Zhang | | G06F 21/31 |
| 11,070,548 B2* | 7/2021 | Nair | | G06F 21/42 |
| 11,212,272 B2* | 12/2021 | Ray | | H04L 63/0815 |
| 11,394,709 B2* | 7/2022 | Gomi | | H04L 63/12 |
| 2003/0110192 A1* | 6/2003 | Valente | | H04L 63/0823 715/234 |
| 2008/0196090 A1* | 8/2008 | Baron | | H04L 9/321 726/5 |
| 2009/0192944 A1* | 7/2009 | Sidman | | G06Q 30/0601 705/75 |
| 2010/0257576 A1* | 10/2010 | Valente | | H04L 41/22 715/764 |
| 2013/0179681 A1* | 7/2013 | Benson | | H04L 63/083 713/155 |
| 2014/0250508 A1* | 9/2014 | Hamlin | | G06F 21/6218 726/6 |
| 2015/0007269 A1* | 1/2015 | Brugger | | H04L 63/0884 726/4 |
| 2015/0373023 A1* | 12/2015 | Walker | | H04L 63/10 726/3 |
| 2016/0248759 A1* | 8/2016 | Tsurumi | | H04L 63/0815 |
| 2017/0034133 A1* | 2/2017 | Korondi | | H04L 63/083 |
| 2017/0127276 A1* | 5/2017 | Koo | | H04L 63/0807 |
| 2017/0230351 A1* | 8/2017 | Hallenborg | | H04L 63/101 |
| 2017/0337361 A1* | 11/2017 | Zhou | | G06F 21/31 |
| 2018/0083952 A1* | 3/2018 | Gummididala | | H04L 63/083 |
| 2018/0084422 A1* | 3/2018 | Mendelevich | | H04L 63/0428 |
| 2018/0131409 A1* | 5/2018 | Hamakawa | | H04W 52/02 |
| 2018/0131839 A1* | 5/2018 | Nakajima | | H04N 1/00344 |
| 2018/0139606 A1* | 5/2018 | Green | | H04W 12/06 |
| 2018/0191700 A1* | 7/2018 | Kong | | H04L 63/0807 |
| 2018/0241750 A1* | 8/2018 | Serban | | H04L 63/10 |
| 2018/0247048 A1* | 8/2018 | Sakemi | | G06F 21/34 |
| 2018/0270216 A1* | 9/2018 | Nakayama | | H04L 63/083 |
| 2019/0069170 A1* | 2/2019 | Jerichow | | H04W 12/06 |
| 2019/0289008 A1* | 9/2019 | Serban | | H04L 63/10 |
| 2019/0332790 A1* | 10/2019 | Kukehalli Subramanya | | G06F 21/33 |
| 2019/0334709 A1* | 10/2019 | Paterour | | H04W 12/06 |
| 2020/0029217 A1* | 1/2020 | Chen | | H04W 8/18 |
| 2020/0050751 A1* | 2/2020 | Woo | | G06F 21/46 |
| 2020/0076797 A1* | 3/2020 | Mihara | | H04L 63/0853 |
| 2020/0137066 A1* | 4/2020 | Erickson | | H04L 63/10 |
| 2021/0258153 A1* | 8/2021 | Yin | | H04L 63/08 |

* cited by examiner

INFORMATION PROCESSING APPARATUS, INFORMATION PROCESSING SYSTEM, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2019-186125 filed Oct. 9, 2019.

BACKGROUND

(i) Technical Field

The present invention relates to an information processing apparatus, an information processing system, and a non-transitory computer readable medium storing a program.

(ii) Related Art

Authentication coordination such as single sign-on may be performed.

JP2019-053692A describes a system in which an apparatus request a service providing apparatus for a first URL for accessing the service providing apparatus and a third URL for passing an ID token to the service providing apparatus, and transmits a second URL for the apparatus to access an authentication cooperation apparatus to the service providing apparatus.

SUMMARY

Incidentally, a mechanism for issuing first credential information for using the Web service by using second credential information indicating that the user has been authenticated is conceivable. In this mechanism, for example, a management apparatus and an authentication server are used. For example, in a case where an information processing apparatus used by a user transmits authentication information to an authentication server and requests user authentication in order to acquire first credential information for using a Web service, the authentication server transmits the authentication information to the management apparatus. The management apparatus performs user authentication by using the authentication information, and transmits second credential information indicating that the user has been authenticated to the authentication server, in a case where the user authentication is successful. In a case of receiving the second credential information from the management apparatus, the authentication server transmits the first credential information for using the Web service to the information processing apparatus. That is, in a case where the management apparatus proves that the user is an authorized user, the authentication server transmits the first credential information to the information processing apparatus. The information processing apparatus is permitted to use the Web service by using the first credential information received from the authentication server. In such a mechanism, in a case where a different authentication server is used for each Web service, the information processing apparatus needs to transmit authentication information for each Web service to each authentication server, and acquire first credential information for using each Web service from each authentication server. That is, since the information processing apparatus has not acquired the second credential information indicating that the user has been authenticated, the information processing apparatus cannot acquire the first credential information from each authentication server by using the second credential information.

Aspects of non-limiting embodiments of the present disclosure relate to an information processing apparatus, an information processing system, and a non-transitory computer readable medium storing a program, in which an information processing apparatus used by a user acquires second credential information indicating that the user has been authenticated, and uses the second credential information to acquire first credential information for using a Web service.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including: a processor configured to request a management apparatus for user authentication to acquire second credential information that is used for acquiring first credential information that is used for a Web service, the second credential information indicating that a user has been authenticated, receive the second credential information transmitted from the management apparatus in a case where the user authentication is successful by the management apparatus, transmit the received second credential information to an authentication server, receive the first credential information transmitted from the authentication server in response to the transmission of the second credential information, and use the Web service by using the received first credential information.

BRIEF DESCRIPTION OF THE DRAWINGS

Exemplary embodiment(s) of the present invention will be described in detail based on the following figures, wherein.

DETAILED DESCRIPTION

Figure 1:
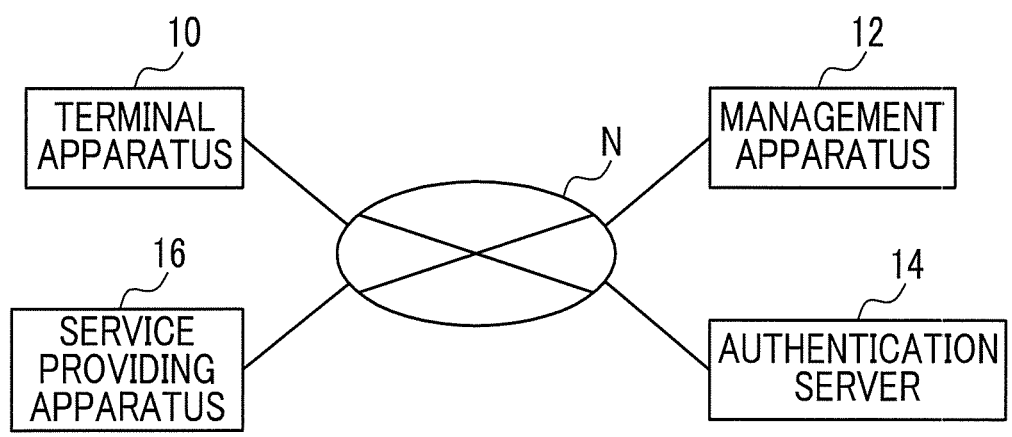
FIG. 1 is a block diagram illustrating a configuration of an information processing system according to the present exemplary embodiment.

An information processing system according to the present exemplary embodiment will be described with reference to FIG. 1. FIG. 1 illustrates an example of the configuration of the information processing system according to the present exemplary embodiment.

The information processing system according to the present exemplary embodiment includes, as an example, one or a plurality of terminal apparatuses 10, a management apparatus 12, one or a plurality of authentication servers 14, and one or a plurality of service providing apparatuses 16.

The terminal apparatus 10, the management apparatus 12, the authentication server 14, and the service providing apparatus 16 each have a function of communicating with other apparatuses. The communication may be wired communication using a cable, or wireless communication. That is, each apparatus may transmit and receive information to and from each other by being physically connected to other apparatuses by a cable, or may transmit and receive information to and from each other by wireless communication. For example, near field communication, Wi-Fi (registered trademark), or the like is used as the wireless communication. Wireless communication of standards other than these may be used. Near field communication is, for example, Bluetooth (registered trademark), radio frequency identifier (RFID), NFC, or the like. Each apparatus may communicate with other apparatuses through a communication path N such as a local area network (LAN) or the Internet.

The terminal apparatus 10 is an apparatus used by a user. The terminal apparatus 10 is, for example, a personal computer (hereinafter referred to as "PC"), a tablet PC, a smartphone, a mobile phone, an image processing apparatus, or another apparatus. The image processing apparatus is, for example, an apparatus (for example, a multifunction peripheral) having at least one of a scan function, a print function, a copy function, and a facsimile function. Of course, other apparatuses may be the terminal apparatus 10. Note that the terminal apparatus 10 corresponds to an example of the information processing apparatus.

The management apparatus 12 is configured to authenticate a user based on authentication information. In a case where the authentication of the user is successful, the management apparatus 12 issues a second token, which is second credential information indicating that the user has been authenticated. That is, the second token is information indicating that the authentication of the user to the management apparatus 12 has been successful. The second token is information for acquiring a first token, which is first credential information for using a Web service provided by the service providing apparatus 16. The authentication information is, for example, information including user identification information (for example, a user ID) for uniquely identifying a user and a password. Biometric information of the user (for example, fingerprint, retina, face, blood vessel, or voice) may be used as authentication information.

For example, a Web service provided by each service providing apparatus 16 and authentication information for authenticating a user are registered in the management apparatus 12, and the management apparatus 12 realizes single sign-on to each Web service by collectively managing accounts for using each Web service. That is, in a case where the authentication by the management apparatus 12 is successful, the use of each Web service registered in the management apparatus 12 is permitted by single sign-on. Federation is set between the management apparatus 12 and the service providing apparatus 16, and, for example, OAuth 2.0, OpenID Connect, WS-Federation, SAML 2.0, or the like is used as an authentication protocol. For example, the management apparatus 12 is Azure (registered trademark) Active Directory (AzureAD).

For example, the first token and the second token are unique text strings in which texts such as alphanumeric characters are randomly arranged. An expiration date may be set for the first token and the second token. Use of the Web service by using the first token whose expiration date has elapsed is not permitted. Acquiring the first token by using the second token whose expiration date has elapsed is not permitted. Further, the range of the right to use the Web service may be set in the first token. An electronic signature may be attached to the first token and the second token.

In a case of receiving the second token indicating that the user has been authenticated by the management apparatus 12, the authentication server 14 is configured to issue a first token for using the Web service provided by the service providing apparatus 16 managed by the authentication server 14. The first token is an access token for using the Web service.

The authentication server 14 may issue a refresh token for updating the first token that is an access token. For example, the refresh token is a unique text string in which texts such as alphanumeric characters are randomly arranged. For example, in a case where the expiration date of the first token that is the access token has passed, the first token can be updated by using the refresh token, and the updated first token can be acquired. An expiration date may be set for the refresh token. The first token cannot be updated by using the refresh token whose expiration date has elapsed. In a case where an expiration date is set for the first token and the refresh token, for example, an expiration date longer than the expiration date of the access token is set for the refresh token. For example, an expiration date of about one month is set for the refresh token, and an expiration date of about tens of minutes, hours, or days is set for the first token. Of course, these times are only examples.

In a case of receiving the refresh token, the authentication server 14 updates the first token associated with the received refresh token, and issues the updated first token and a new refresh token for further updating the updated first token. The user is permitted to use the Web service provided by the service providing apparatus 16 by using the updated first token. In a case where the first token is updated, the old first token before updating is invalidated, and the Web service cannot be used by using the old first token. Further, the old refresh token used to update the first token is invalidated, and the first token cannot be updated by using the old refresh token. The refresh token corresponds to an example of the third credential information.

The service providing apparatus 16 is configured to provide a Web service. The Web service is, for example, a service for providing an application on a network such as the Internet, and other services. For example, web mails, social network services (SNS), services that provide video and music on the Internet, services for selling products and making reservations on the Internet, Search services on the Internet, services that provide information on the Internet, services that provides settlement tools on the Internet, or the like are an example of the Web service. Of course, Web services other than these may be provided by the service providing apparatus 16.

The user is permitted to use the Web service provided by the service providing apparatus 16 by using the first token. A different first token may be issued for each Web service. In this case, the user is permitted to use the Web service associated with the first token given to the user.

For example, the information processing system includes a plurality of authentication servers 14 and a plurality of service providing apparatuses 16, and a different authentication server 14 is used for each service providing apparatus 16. That is, respective service providing apparatuses 16 are associated with the authentication servers 14 which are different from each other, and respective service providing apparatuses 16 are managed by the authentication servers 14 which are different from each other In a case of receiving the first token issued by the authentication server 14 that manages the service providing apparatus 16 that is the authentication server 14 which is associated with the service providing apparatus 16), the service providing apparatus 16 permits the user to use the Web service associated with the first token. In other words, even in a case of receiving the first token issued by the authentication server 14 that does not manage the service providing apparatus 16 that is the authentication server 14 (that is, the authentication server 14 that is not associated with the service providing apparatus 16), the service providing apparatus 16 does not permit the user to use the Web service provided by the service providing apparatus 16. For example, a different service providing apparatus 16 is used for each Web service, and a different authentication server 14 is used for each Web service. By using the first token issued by a certain authentication server 14, use of the Web service provided by the service providing apparatus 16 managed by the authentication server 14 is permitted, but use of another web service provided by another service providing apparatus 16 is not permitted. Note that a plurality of service providing apparatuses 16 may be associated with one authentication server 14 and a plurality of service providing apparatuses 16 may be managed by one authentication server 14. In this case, by using the first token issued by the authentication server 14, use of the Web service provided by each of the plurality of service providing apparatuses 16 may be permitted.

Figure 2:
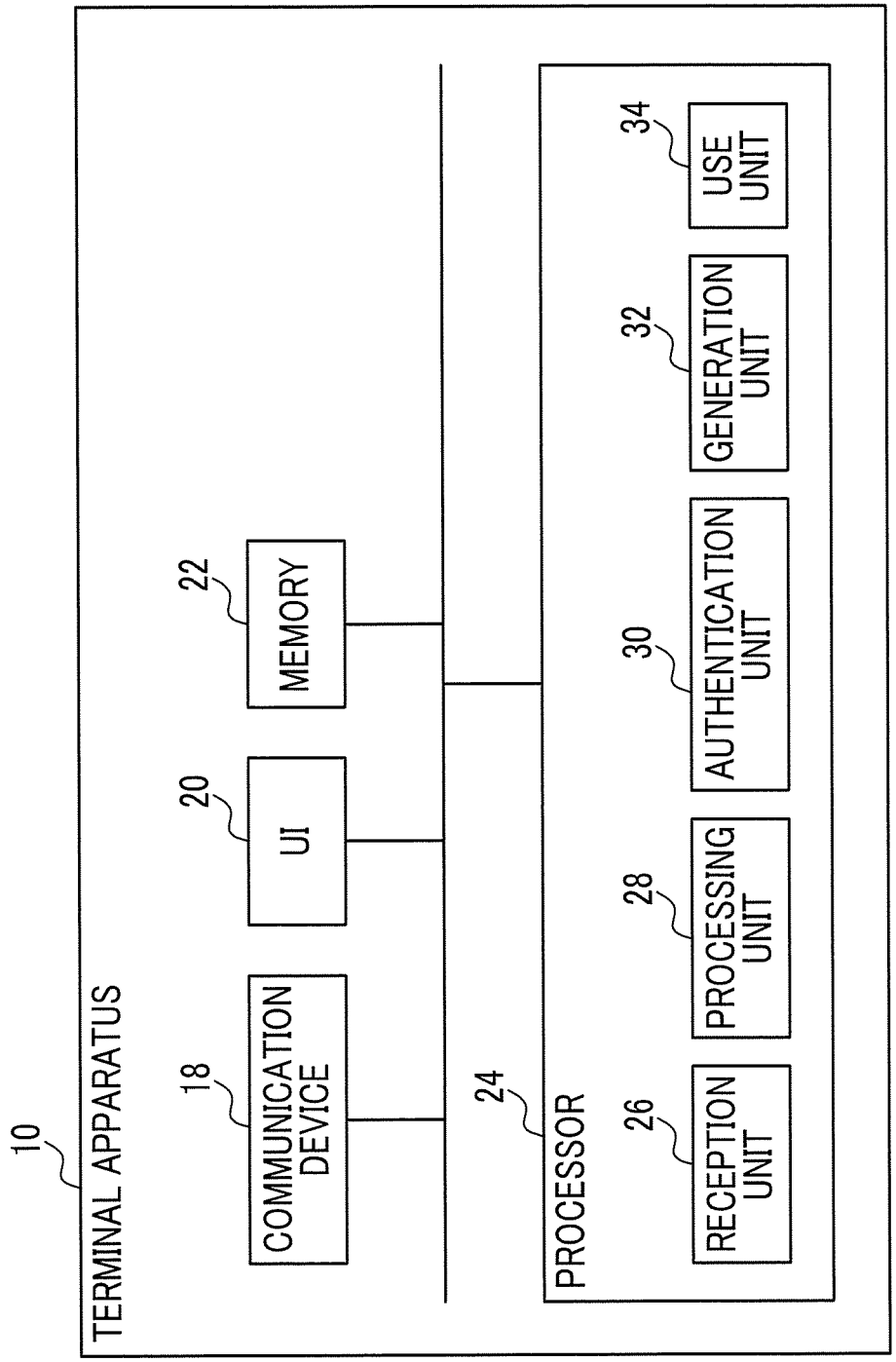
FIG. 2 is a block diagram illustrating a configuration of a terminal apparatus according to the present exemplary embodiment.

Hereinafter, the configuration of the terminal apparatus 10 will be described with reference to FIG. 2. FIG. 2 illustrates an example of a hardware configuration and a functional configuration of the terminal apparatus 10.

The terminal apparatus 10 includes, for example, a communication device 18, a UI 20, a memory 22, and a processor 24. In a case where the terminal apparatus 10 is an image processing apparatus such as a multifunction peripheral, the terminal apparatus 10 further includes a scanner which is an apparatus that generates image data by optically reading a document, a printer which is an apparatus that prints an image on paper, or the like.

The communication device 18 is a communication interface, and has a function of transmitting information to other apparatuses and a function of receiving information transmitted from other apparatuses. The communication device 18 may have a wireless communication function or may have a wired communication function. The communication device 18 may communicate with other devices by using, for example, near field communication, or may communicate with other devices through a communication path such as a LAN or the Internet.

The UI 20 is a user interface, and includes a display device and an operation device. The display device is a liquid crystal display, an EL display, or the like. The operation device is a keyboard, input keys, an operation panel, or the like. The UI 20 may be a UI such as a touch panel that has both a display device and an operation device. In addition, a microphone may be included in the UI 20, and a speaker that emits sound may be included in the UI 20.

The memory 22 is a storage device that constitutes one or a plurality of storage areas for storing various types of information. The memory 22 is, for example, a hard disk drive, a RAM, a DRAM, a ROM, an optical disk, other storage devices, or a combination thereof. One or a plurality of memories 22 are included in the terminal apparatus 10.

The processor 24 is configured to control the operation of each unit of the terminal apparatus 10. For example, the processor 24 may communicate with each apparatus by using the communication device 18, display information on a display device of the UI 20, receive information input via the UI 20, store the information in the memory 22, or read the information from the memory 22. The processor 24 may have a memory.

The reception unit 26 is configured to receive authentication information. The authentication information is information used to authenticate the user to the management apparatus 12. For example, the user operates the UI 20 to input authentication information to the terminal apparatus 10, and the reception unit 26 receives the authentication information input by the user.

The processing unit 28 is configured to transmit and receive information to and from the management apparatus 12 and the authentication server 14. For example, the processing unit 28 transmits the authentication information received by the reception unit 26 to the management apparatus 12, and receives the second token transmitted from the management apparatus 12. Further, the processing unit 28 transmits the second token to the authentication server 14 and receives the first token transmitted from the authentication server 14. The processing unit 28 stores the first token and the second token in the memory 22. In a case where a refresh token is transmitted from the authentication server 14 to the terminal apparatus 10, the processing unit 28 receives the refresh token and stores the refresh token in the memory 22. The processing unit 28 may transmit the refresh token to the authentication server 14, and receive a first token updated by the refresh token and a refresh token for further updating the first token, from the authentication server 14.

The authentication unit 30 is configured to authenticate a user to the terminal apparatus 10. For authentication of the user to the terminal apparatus 10, authentication information used for authentication of the user to the management apparatus 12 may be used, or another type of authentication information may be used. For example, in a case where the authentication of the user to the terminal apparatus 10 is successful, the user is permitted to log in to the terminal apparatus 10. Authentication of the user to the terminal apparatus 10 may be performed by the management apparatus 12. For example, in a case where the authentication of the user to the management apparatus 12 is successful, the authentication of the user to the terminal apparatus 10 may also be successful. In this case, the authentication unit 30 may not be provided in the terminal apparatus 10.

The generation unit 32 is configured to generate secret information. The secret information is specific information determined only between the terminal apparatus 10 and the authentication server 14, and is information indicating that the terminal apparatus 10 has an authority to acquire the first token from the authentication server 14 and use the Web service. The processing unit 28 transmits the second token and the secret information to the authentication server 14. For example, the generation unit 32 encrypts any text string. The encrypted text string corresponds to an example of secret information. The any text string is a text string predetermined between the terminal apparatus 10 and the authentication server 14, and is stored in the memory 22 of the terminal apparatus 10 and the authentication server 14. The any text string may be determined by the administrator of the authentication server 14 or the user, or may be automatically determined by the authentication server 14 or the terminal apparatus 10. For example, the any text string is a text string in which alphanumeric characters and the like are randomly arranged. The processing unit 28 transmits the second token and secret information that is an encrypted text string to the authentication server 14. Information (for example, an encryption key) used for encryption is stored in the authentication server 14 in advance, and the text string encrypted by the generation unit 32 is decrypted by the authentication server 14. As will be described later, the authentication server 14 verifies the second token and the secret information transmitted from the terminal apparatus 10 and determines whether to transmit the first token to the terminal apparatus 10 based on the result of the verification.

As another example, the generation unit 32 may encrypt the second token. In this case, the generation unit 32 encrypts the second token by using an encryption key determined only between the terminal apparatus 10 and the authentication server 14. The encrypted second token corresponds to an example of secret information. The processing unit 28 transmits the encrypted second token to the authentication server 14.

Note that the secret information may not be used for the terminal apparatus 10 to acquire the first token from the authentication server 14. In this case, the generation unit 32 may not be provided in the terminal apparatus 10.

The use unit 34 is configured to use the Web service by using the first token. For example, the use unit 34 transmits the first token to the service providing apparatus 16. More specifically, the use unit 34 transmits the first token received from the authentication server 14 that manages the service providing apparatus 16 that provides the Web service selected by the user to the service providing apparatus 16. The validity of the first token is verified by the service providing apparatus 16, the authentication server 14, the management apparatus 12, a combination thereof, or another apparatus. In a case where the validity of the first token is verified and the first token is confirmed to be valid, the use unit 34 is permitted to use the Web service provided by the service providing apparatus 16. In a case where the first token is confirmed to be invalid (that is, in a case where the first token is confirmed to be valid), the use unit 34 is not permitted to use the Web service provided by the service providing apparatus 16.

The reception unit 26, the processing unit 28, the authentication unit 30, the generation unit 32, and the use unit 34 described above are realized by the processor 24. A memory may be used for the realization.

Figure 3:
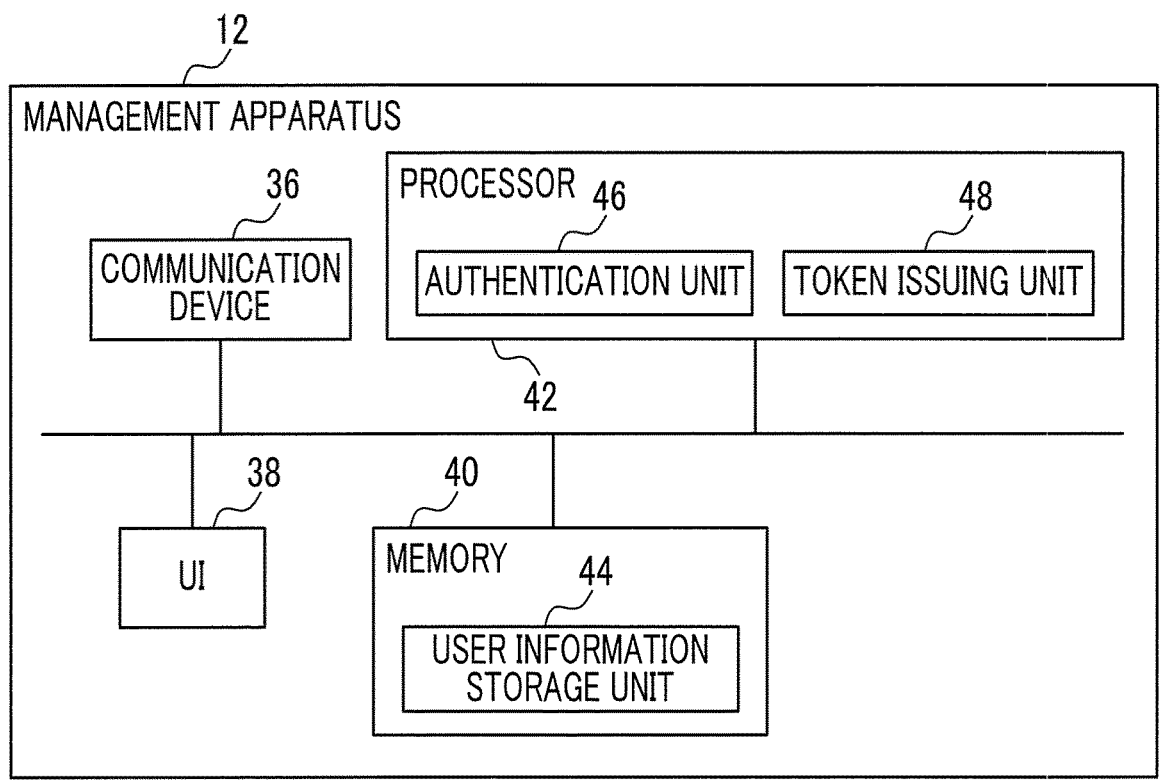
FIG. 3 is a block diagram illustrating a configuration of a management apparatus according to the present exemplary embodiment.

Hereinafter, the configuration of the management apparatus 12 will be described with reference to FIG. 3. FIG. 3 illustrates an example of a hardware configuration and a functional configuration of the management apparatus 12.

The management apparatus 12 includes, for example, a communication device 36, a UI 38, a memory 40, and a processor 42.

The communication device 36 is a communication interface, and has a function of transmitting information to other apparatuses and a function of receiving information transmitted from other apparatuses. The communication device 36 may have a wireless communication function or may have a wired communication function. The communication device 36 may communicate with other devices by using, for example, near field communication, or may communicate with other devices through a communication path such as a LAN or the Internet.

The UI 38 is a user interface, and includes a display device and an operation device. The display device is a liquid crystal display, an EL display, or the like. The operation device is a keyboard, input keys, an operation panel, or the like. The UI 38 may be a UI such as a touch panel that has both a display device and an operation device. In addition, a microphone may be included in the UI 38, and a speaker that emits sound may be included in the UI 38.

The memory 40 is a storage device that constitutes one or a plurality of storage areas for storing various types of information. The memory 40 is, for example, a hard disk drive, a RAM, a DRAM, a ROM, an optical disk, other storage devices, or a combination thereof. One or a plurality of memories 40 are included in the management apparatus 12.

The processor 42 is configured to control the operation of each unit of the management apparatus 12. For example, the processor 42 may communicate with each apparatus by using the communication device 36, display information on a display device of the UI 38, receive information input via the UI 38, store the information in the memory 40, or read the information from the memory 40. The processor 42 may have a memory.

The user information storage unit 44 is a storage area in which authentication information about a user registered in the management apparatus 12 is stored. The user information storage unit 44 is a storage area configured by the memory 40.

The authentication unit 46 is configured to authenticate the user by using the authentication information. For example, in a case where the authentication information transmitted from the terminal apparatus 10 is stored in the user information storage unit 44, the authentication unit 46 succeeds in the authentication. In a case where the authentication information transmitted from the terminal apparatus 10 is not stored in the user information storage unit 44, the authentication unit 46 fails the authentication.

The token issuing unit 48 is configured to issue a second token. For example, in a case where the authentication of the user is successful based on the authentication information, the token issuing unit 48 issues a second token. The issued second token is transmitted from the authentication server 14 to the terminal apparatus 10. The token issuing unit 48 may set an expiration date for the second token. The expiration date may be determined in advance, or may be set by an administrator or the like. Further, the token issuing unit 48 may attach an electronic signature to the second token.

The authentication unit 46 and the token issuing unit 48 are realized by the processor 42. A memory may be used for the realization.

Figure 4:
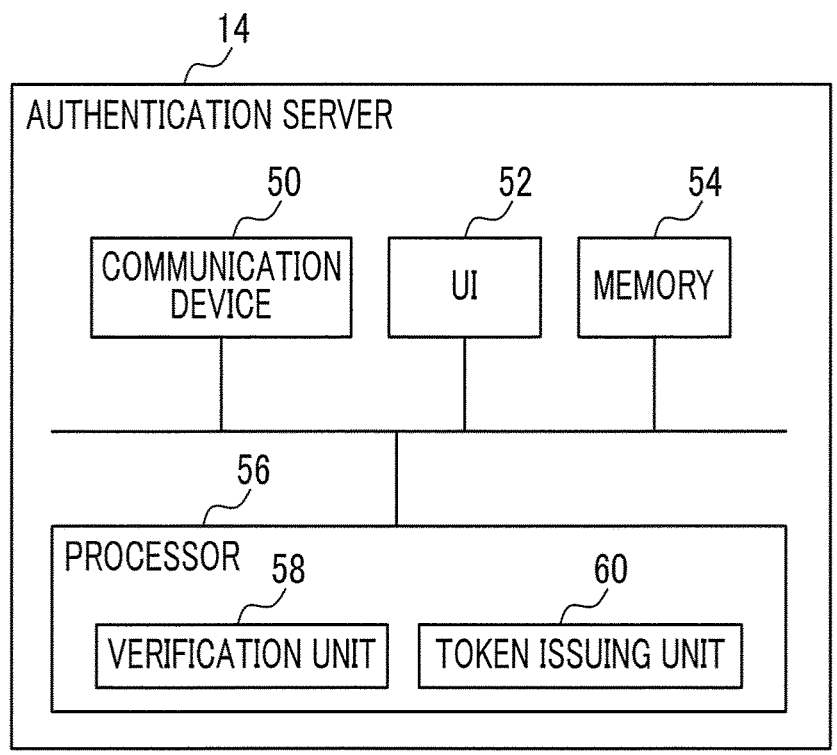
FIG. 4 is a block diagram illustrating a configuration of an authentication server according to the present exemplary embodiment.

Hereinafter, the configuration of the authentication server 14 will be described with reference to FIG. 4. FIG. 4 illustrates an example of a hardware configuration and a functional configuration of the authentication server 14.

The authentication server 14 includes, for example, a communication device 50, a UI 52, a memory 54, and a processor 56.

The communication device 50 is a communication interface, and has a function of transmitting information to other apparatuses and a function of receiving information transmitted from other apparatuses. The communication device 50 may have a wireless communication function or may have a wired communication function. The communication device 50 may communicate with other devices by using, for example, near field communication, or may communicate with other devices through a communication path such as a LAN or the Internet.

The UI 52 is a user interface, and includes a display device and an operation device. The display device is a liquid crystal display, an EL display, or the like. The operation device is a keyboard, input keys, an operation panel, or the like. The UI 52 may be a UI such as a touch panel that has both a display device and an operation device. In addition, a microphone may be included in the UI 52, and a speaker that emits sound may be included in the UI 52.

The memory 54 is a storage device that constitutes one or a plurality of storage areas for storing various types of information. The memory 54 is, for example, a hard disk drive, a RAM, a DRAM, a ROM, an optical disk, other storage devices, or a combination thereof. One or a plurality of memories 54 are included in the authentication server 14.

The processor 56 is configured to control the operation of each unit of the authentication server 14. For example, the processor 56 may communicate with each apparatus by using the communication device 50, display information on a display device of the UI 52, receive information input via the UI 52, store the information in the memory 54, or read the information from the memory 54. The processor 56 may have a memory.

The verification unit 58 is configured to verify whether or not the user has the right to acquire the first token and use the Web service, based on the second token transmitted from the terminal apparatus 10. Hereinafter, the process by the verification unit 58 will be described in detail.

For example, in a case of receiving the second token transmitted from the terminal apparatus 10, the verification unit 58 verifies the validity of the second token. In a case where the expiration date has been set for the second token and the expiration date has not elapsed, the verification unit 58 determines that the second token is valid. In a case where the expiration date has elapsed, the verification unit 58 determines that the second token is not valid (that is, invalid). In a case where the expiration date is not set for the second token, the verification unit 58 determines that the second token is valid. As another example, the verification unit 58 may determine that the second token is valid in a case where the electronic signature is attached to the second token, and determine that the second token is not valid in a case where the electronic signature is not attached to the second token. In a case where the second token is valid, the verification unit 58 recognizes that the user using the terminal apparatus 10 that has transmitted the second token to the authentication server 14 is a user authenticated by the management apparatus 12, and determine that the user has the authority to acquire the first token and use the Web service. That is, the verification unit 58 recognizes that the authentication of the user to the management apparatus 12 is successful, and determines that the user has the authority to acquire the first token and use the Web service. In a case where the second token is not valid, the verification unit 58 determines that the user does not have the right to acquire the first token and use the Web service.

As another example, based on the second token and the secret information transmitted from the terminal apparatus 10, the verification unit 58 may verify whether or not the user has the right to acquire the first token and use the Web service by using the terminal apparatus 10. That is, the verification unit 58 may verify the validity of the second token and the secret information, and may verify whether or not the user has the right to acquire the first token and use the Web service by using the terminal apparatus 10, based on the result of the verification. Hereinafter, this other example will be described in detail.

As a premise of this other example, a text string predetermined only between the terminal apparatus 10 and the authentication server 14 or information (for example, an encryption key) used for encryption by the generation unit 32 of the terminal apparatus 10 is stored in advance in the memory 54.

The verification unit 58 verifies whether or not the terminal apparatus 10 has the right to acquire the first token and use the Web service, based on the secret information transmitted from the terminal apparatus 10. In a case where any encrypted text string is secret information, the verification unit 58 decrypts the secret information by using the encryption key. In a case where the decrypted original text string is stored in the memory 54, the verification unit determines that the terminal apparatus 10 that has transmitted the secret information to the authentication server 14 has the right to acquire the first token and use the Web service. In a case where the decrypted original text string is not stored in the memory 54, the verification unit 58 determines that the terminal apparatus 10 that has transmitted the secret information to the authentication server 14 does not have the right to acquire the first token and use the Web service.

In a case where the second token is valid and the original text string decrypted from the secret information is stored in the memory 54 of the authentication server 14, the verification unit 58 determines that the user has the right to acquire the first token and use the Web service by using the terminal apparatus 10.

In a case where the second token is valid but the original text string decrypted from the secret information is not stored in the memory 54 of the authentication server 14, the verification unit 58 determines that the user does not have the right to acquire the first token and use the Web service by using the terminal apparatus 10.

In a case where the second token is valid but the authentication server 14 has not received the secret information from the terminal apparatus 10, the verification unit 58 determines that the user does not have the right to acquire the first token and use the Web service by using the terminal apparatus 10.

In a case where the second token is not valid, regardless of whether or not the authentication server 14 has received the secret information from the terminal apparatus 10, the verification unit 58 determines that the user does not have the right to acquire the first token and use the Web service by using the terminal apparatus 10.

In a case where the encrypted second token is secret information, the verification unit 58 decrypts the secret information by using the encryption key and determines the validity of the second token. In a case where the second token is valid, the verification unit 58 determines that the user has the right to acquire the first token and use the Web service by using the terminal apparatus 10. In a case where the second token is not valid, the verification unit 58 determines that the user does not have the right to acquire the first token and use the Web service by using the terminal apparatus 10.

Of course, the verification unit 58 may verify whether or not the user has the right to acquire the first token and use the Web service, based on the validity of the second token, without using the secret information.

The token issuing unit 60 is configured to issue a first token. For example, in a case where the verification unit 58 verifies the validity of the second token and determines that the user has the right to acquire the first token and use the Web service based on the result of the verification, the token issuing unit 60 issues a first token for using a Web service provided by the service providing apparatus 16 managed by the authentication server 14. Further, in a case where the verification unit 58 verifies the validity of the second token and the secret information and determines that the user has the right to acquire the first token and use the Web service based on the result of the verification by using the terminal apparatus 10, the token issuing unit 60 may issue a first token for using a Web service provided by the service providing apparatus 16 managed by the authentication server 14. The issued first token is transmitted from the authentication server 14 to the terminal apparatus 10 that has transmitted the second token to the authentication server 14. The terminal apparatus 10 that has received the first token is permitted to use the Web service by using the first token. The token issuing unit 60 may set an expiration date for the first token. The expiration date may be determined in advance, or may be set by an administrator or the like. Further, the token issuing unit 60 may attach an electronic signature to the first token.

Note that the token issuing unit 60 may transmit the first token to the terminal apparatus 10 that has transmitted the second token to the authentication server 14 without verifying the validity of the second token. For example, in a case where the authentication server 14 receives the second token transmitted from the terminal apparatus 10, the token issuing unit 60 may transmit the first token to the terminal apparatus 10.

The token issuing unit 60 may issue a refresh token for updating the first token. In this case, the first token and the refresh token are transmitted from the authentication server 14 to the terminal apparatus 10. The token issuing unit 60 may set an expiration date for the refresh token. The expiration date of the first token and the expiration date of the refresh token may be the same or different. For example, the expiration date of the first token is set to be shorter than the expiration date of the refresh token. Further, the token issuing unit 60 may attach an electronic signature to the refresh token.

The token issuing unit 60 may update the first token associated with the refresh token, based on the refresh token, and issue the updated first token and a refresh token for further updating the updated first token. For example, in a case where the authentication server 14 receives the refresh token transmitted from the terminal apparatus 10, the token issuing unit 60 updates the first token associated with the refresh token.

The updated first token and the new refresh token are transmitted to the terminal apparatus 10 that has transmitted the refresh token to the authentication server 14. In a case where the first token is updated, the token issuing unit 60 invalidates the old first token before the update and the old refresh token used for updating the first token. In a case where the refresh token is not valid due to the passage of the expiration date set for the refresh token, the token issuing unit 60 does not update the first token associated with the refresh token.

Figure 5:
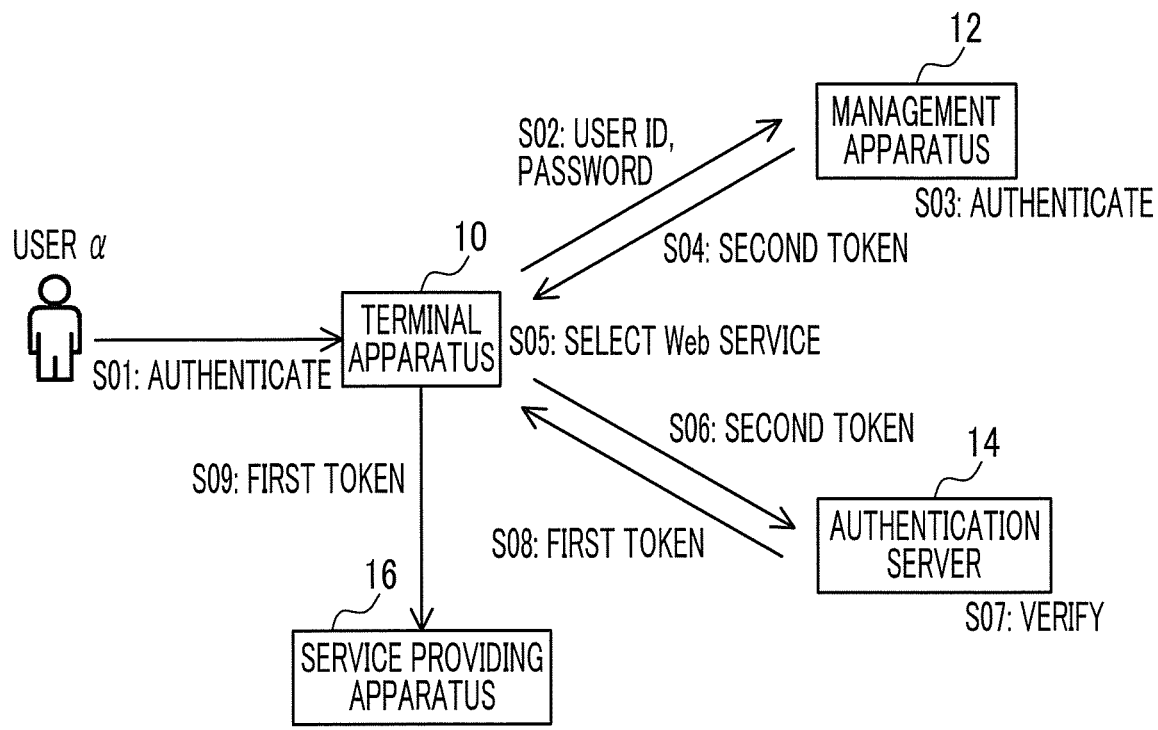
FIG. 5 is a diagram for explaining a flow of process performed by the information processing system according to the present exemplary embodiment.

Hereinafter, with reference to FIG. 5, the processing flow by the information processing system according to the present exemplary embodiment will be described. Here, as an example, it is assumed that the user α is authenticated by the management apparatus 12 and uses the Web service.

First, authentication of the user α is performed by the terminal apparatus 10 (S01). For example, the user α operates the UI 20 of the terminal apparatus 10 and inputs authentication information (for example, a user ID and a password) used for the authentication of the user α to the terminal apparatus 10. The authentication unit 30 of the terminal apparatus 10 authenticates the user α based on the authentication information. In a case where the authentication of the user α for the terminal apparatus 10 is successful, the user α is permitted to log in to the terminal apparatus 10, and the process proceeds to S02 which is the next step. For example, in a case where the authentication of the user α to the terminal apparatus 10 has failed, the user is not permitted to log in to the terminal apparatus 10, and the process ends without proceeding to S02. Note that the process of S01 may not be performed, and the processes of S02 and subsequent steps may be performed. Hereinafter, the processes of S02 and subsequent steps will be described.

In a case where the user α operates the UI 20 of the terminal apparatus 10 to request an access to the management apparatus 12, the processing unit 28 of the terminal apparatus 10 accesses the management apparatus 12, and displays a login screen for inputting authentication information (for example, a user ID and a password) for logging in to the management apparatus 12 on the display device of the UI 20.

In a case where the user α inputs a user ID and a password on the login screen and instructs transmission, the processing unit 28 of the terminal apparatus 10 transmits the user ID and the password input by the user α to the management apparatus 12 (S02).

The authentication unit 46 of the management apparatus 12 receives the user ID and the password transmitted from the terminal apparatus 10, and authenticates the user α based on the user ID and the password (S03). For example, in a case where the user ID and the password are stored in the user information storage unit 44 of the management apparatus 12, the authentication of the user α to the management apparatus 12 succeeds. In a case where the user ID and the password are not stored in the user information storage unit 44, the authentication of the user α to the management apparatus 12 fails. In a case where the authentication of the user α to the management apparatus 12 has failed, the process ends, and the processes of S04 and subsequent steps are not performed.

In a case where the authentication of the user α to the management apparatus 12 is successful, the authentication unit 46 permits the user α to log in to the management apparatus 12. The token issuing unit 48 issues a second token indicating that the user α is a user authenticated by the management apparatus 12, and transmits the second token to the terminal apparatus 10 (S04).

The processing unit 28 of the terminal apparatus 10 receives the second token transmitted from the management apparatus 12, and stores the second token in the memory 22 of the terminal apparatus 10.

Next, the user α operates the UI 20 of the terminal apparatus 10 to select a Web service to be used by the user α (S05).

The processing unit 28 transmits the second token transmitted from the management apparatus 12 to the terminal apparatus 10, to the authentication server 14 that manages the service providing apparatus 16 that provides the Web service selected by the user α (that is, the authentication server 14 that issues the first token for using the Web service), and request the authentication server 14 for issuance of the first token (S06).

In a case where the authentication server 14 receives the second token transmitted from the terminal apparatus 10, the verification unit 58 of the authentication server 14 verifies the validity of the second token (S07).

In a case where the second token is valid, the token issuing unit 60 of the authentication server 14 issues the first token for using the Web service provided by the service providing apparatus 16 managed by the authentication server 14, and transmits the first token to the terminal apparatus 10 that has transmitted the second token to the authentication server 14 (S08). The token issuing unit 60 of the authentication server 14 may issue a refresh token for updating the first token, and transmit the first token and the refresh token to the terminal apparatus 10.

The processing unit 28 of the terminal apparatus 10 receives the first token transmitted from the authentication server 14, and stores the first token in the memory 22 of the terminal apparatus 10. In a case where the refresh token is transmitted from the authentication server 14 to the terminal apparatus 10 together with the first token, the processing unit 28 stores the first token and the refresh token in the memory 22.

In a case where the user α operates the UI 20 of the terminal apparatus 10 to instruct the use of the Web service, the use unit 34 of the terminal apparatus 10 transmits the first token received from the authentication server 14, to the service providing apparatus 16 that provides the Web service selected by the user α in S05 (S09).

In a case where the validity of the first token transmitted from the terminal apparatus 10 to the service providing apparatus 16 is verified and the first token is confirmed to be valid, the use unit 34 is permitted to use the Web service provided by the service providing apparatus 16.

In the memory 22 of the terminal apparatus 10, a second token indicating that the user α has been authenticated by the management apparatus 12 is stored. In a case where the expiration date set in the second token has not elapsed, the terminal apparatus 10 may transmit the second token to another authentication server 14 to acquire another first token for using another Web service provided by another service providing apparatus 16 managed by another authentication server 14. In this case, the use unit 34 of the terminal apparatus 10 is permitted to use the different Web service by transmitting the different first token to the different service providing apparatus 16.

The processing unit 28 of the terminal apparatus 10 may transmit the refresh token stored in the memory 22 of the terminal apparatus 10 to the authentication server 14 and request the authentication server 14 to update the first token. The authentication server 14 updates the first token based on the refresh token, and transmits the updated first token and a refresh token for further updating the updated first token to the terminal apparatus 10. The use unit 34 of the terminal apparatus 10 is permitted to use the Web service by using the updated first token.

The processing unit 28 of the terminal apparatus 10 receives, from the management apparatus 12, information for creating a screen for the user to input authentication information used for authenticating the user to the management apparatus 12, creates the screen based on the information for creating the screen, and displays the created screen on the display device of the UI 20. The screen for the user to input the authentication information is, for example, a login screen for inputting the authentication information for logging in to the management apparatus 12. The information for creating the login screen is, for example, information indicating the specifications of the login screen. Specifically, the information for creating the login screen is information indicating a screen layout, a design, a screen transition, and the like. The processing unit 28 creates a login screen for the display device of the UI 20, based on information for creating the login screen, under the restriction of the hardware of the display device of the UI 20. The login screen for the display device is, for example, a screen having a size corresponding to the size of the display device, or a screen for the user to be able to input the user ID and the password without scrolling the login screen on the display device of the UI 20. Further, the user or the administrator of the terminal apparatus 10 may create the login screen based on the information for creating the login screen. In this way, the creation of the login screen can be controlled on the terminal apparatus 10 side.

In a case where the terminal apparatus 10 receives the second token transmitted from the management apparatus 12, the generation unit 32 of the terminal apparatus 10 may generate secret information. The secret information may be any encrypted text string, or may be an encrypted second token. In a case where any encrypted text string is secret information, the processing unit 28 of the terminal apparatus 10 transmits the second token and the secret information to the authentication server 14 in S06 in FIG. 5, and requests issuance of the first token. In S07 in FIG. 5, based on the second token and the secret information transmitted from the terminal apparatus 10, the verification unit 58 of the authentication server 14 verifies whether or not the user has the right to acquire the first token and use the Web service by using the terminal apparatus 10. In a case where the encrypted second token is secret information, the processing unit 28 of the terminal apparatus 10 transmits the secret information to the authentication server 14 in S06 in FIG. 5. In S07 in FIG. 5, based on the secret information transmitted from the terminal apparatus 10, the verification unit 58 of the authentication server 14 verifies whether or not the user has the right to acquire the first token and use the Web service by using the terminal apparatus 10. In a case where the verification unit 58 determines that the user has the right to acquire the first token and use the Web service by using the terminal apparatus 10, the token issuing unit 60 of the authentication server 14 issues the first token and transmits the first token to the terminal apparatus 10, in S08 in FIG. 5.

Hereinafter, with reference to FIG. 6, a process in the case of using secret information will be described in detail.

First, (1) the generation unit 32 of the terminal apparatus 10 encrypts the text string determined only between the terminal apparatus 10 and the authentication server 14. Thus, an encrypted text string is created. This encrypted text string is the secret information. The text string before the encryption and the information used for the encryption (for example, the encryption key) are stored in the memory 22 of the terminal apparatus 10 and the memory 54 of the authentication server 14 in advance. Note that secret information, which is an encrypted text string, may be stored in the memory 22 of the terminal apparatus 10 in advance. In this case, the generation unit 32 does not perform encryption.

Next, (2) the generation unit 32 of the terminal apparatus 10 associates the second token received from the management apparatus 12 with the secret information (that is, the encrypted text string). Associating the second token with the secret information refers to, for example, attaching the secret information to the second token or including the secret information in the second token.

Next, (3) the processing unit 28 of the terminal apparatus 10 transmits the second token and the secret information to the authentication server 14.

Next, (4) in a case of receiving the second token and the secret information from the terminal apparatus 10, the verification unit 58 of the authentication server 14 decrypts the secret information by using the encryption key, and verifies whether or not the user has the right to acquire the first token and use the Web service, based on the decrypted text string and the second token. The specific contents of the verification are as described above.

Hereinafter, another process in the case of using secret information will be described in detail with reference to FIG. 7.

First, (1) the generation unit 32 of the terminal apparatus 10 encrypts the second token by using an encryption key determined only between the terminal apparatus 10 and the authentication server 14. This encrypted second token is the secret information.

Next, (2) the processing unit 28 of the terminal apparatus 10 transmits the secret information to the authentication server 14.

Next, (3) in a case of receiving the secret information from the terminal apparatus 10, the verification unit 58 of the authentication server 14 decrypts the secret information by using the encryption key, and verifies the validity of the decrypted second token. The specific contents of the verification are as described above.

In a mechanism in which secret information is used, the second token is transmitted to the authentication server 14 and the first token is not transmitted to an apparatus which does not transmit the secret information to the authentication server 14.

Figure 6:
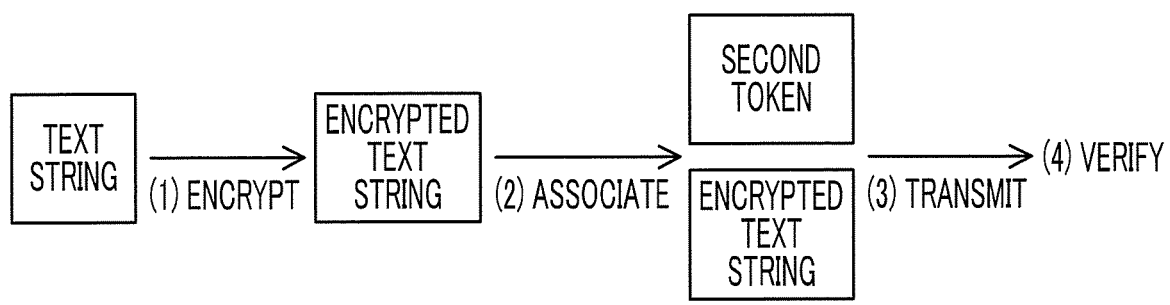
FIG. 6 is a diagram for explaining a process using secret information.
Figure 7:
FIG. 7 is a diagram for explaining a process using secret information.

In a case where the secret information is not used, the processes shown in FIGS. 6 and 7 are not executed.

Figure 8:
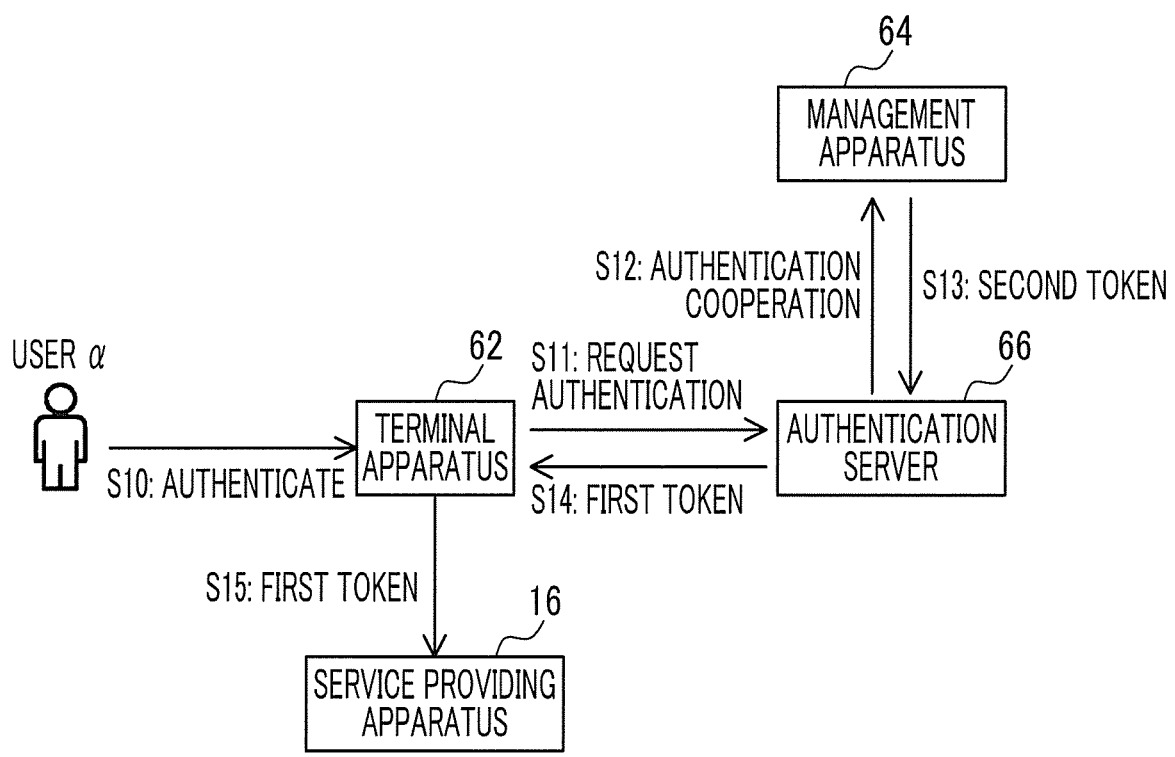
FIG. 8 is a diagram for explaining a flow of process performed by the information processing system according to a comparative example.

Hereinafter, a process performed by the information processing system according to the comparative example will be described with reference to FIG. 8.

The information processing system according to the comparative example includes a service providing apparatus 16, a terminal apparatus 62, a management apparatus 64, and an authentication server 66.

The terminal apparatus 62 is a PC or an image processing apparatus used by a user. The management apparatus 64 is configured to authenticate the user, issue a second token and transmit the second token to the authentication server 66 in a case where the authentication is successful. In a case of receiving the second token transmitted from the management apparatus 64, the authentication server 66 is configured to issue the first token and transmit the first token to the terminal apparatus 62.

First, authentication of the user α is performed by the terminal apparatus 62 (S10). In a case where the authentication is successful, the processes of S11 and subsequent steps are performed. In a case where the authentication fails, the processes of S11 and subsequent steps are not performed. In addition, the process of S10 may not be performed. Hereinafter, the processes of S11 and subsequent steps will be described.

Ina case where the user α operates the terminal apparatus 62 to select a Web service and requests authentication, the terminal apparatus 62 transmits information indicating the Web service selected by the user α and information indicating the authentication request to the authentication server 66 (S11).

In a case of receiving the authentication request from the terminal apparatus 62, the authentication server 66 performs authentication cooperation (S12). Specifically, in response to the request from the authentication server 66, the management apparatus 64 transmits information on a login screen for inputting authentication information (for example, a user ID and a password) for logging in to the management apparatus 64 to the terminal apparatus 62 via the authentication server 66. The terminal apparatus 62 displays the login screen. In a case where the user α inputs the authentication information on the login screen, the authentication information is transmitted from the terminal apparatus 62 to the management apparatus 64 via the authentication server 66. The management apparatus 64 authenticates the user α to the management apparatus 64 by using the authentication information.

In a case where the authentication of the user α to the management apparatus 64 is successful, the management apparatus 64 issues a second token indicating that the authentication of the user α to the management apparatus 64 is successful, and transmits the second token to the authentication server 66 (S13). In a case where the authentication of the user α to the management apparatus 64 has failed, the management apparatus 64 does not issue the second token. In this case, the processes of S14 and subsequent steps are not performed.

In a case of receiving the second token transmitted from the management apparatus 64, the authentication server 66 issues a first token for using the Web service selected by the user α and transmits the first token to the terminal apparatus 62 (S14).

The terminal apparatus 62 receives the first token transmitted from the authentication server 66. In a case of using the Web service, the terminal apparatus 62 transmits the first token to the service providing apparatus 16 that provides the Web service selected by the user α (S15). Thus, the user α is permitted to use the Web service.

In the comparative example, the terminal apparatus 62 does not acquire the second token. Therefore, in order for the user α to use another Web service, it is necessary to perform the processes of S10 and subsequent steps again to acquire the first token for using another Web service. Specifically, it is necessary to start from an operation for logging in to the management apparatus 64 (for example, input of authentication information). On the other hand, in the present exemplary embodiment, the terminal apparatus 10 acquires the second token. Therefore, in a case where the acquired second token is valid, without performing the operation for logging in to the management apparatus 12 again, the terminal apparatus 10 can use another Web service by acquiring the first token for using another web service, by using the second token.

In the embodiments above, the term "processor" refers to hardware in a broad sense. Examples of the processor includes general processors (e.g., CPU: Central Processing Unit), dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor, coupled to a memory, and configured to:
request a management apparatus for user authentication to acquire second credential information that is used for acquiring first credential information that is used for a Web service provided by a service providing apparatus, the second credential information indicating that a user has been authenticated to the management apparatus, wherein the first credential information comprising a first token issued by the authentication server, the second credential information comprising a second token issued by the management apparatus, and the second token comprising information for acquiring the first token to use the Web service provided by the service providing apparatus,
receive the second credential information transmitted from the management apparatus in a case where the user authentication is successful by the management apparatus,
transmit the received second credential information to an authentication server in a case where the user authentication is successful by the management apparatus, and specific information determined only between the information processing apparatus and the authentication server,
receive the first credential information transmitted from the authentication server in response to the transmission of the second credential information based on a result of verification of the transmitted second credential information and the specific information,
transmit third credential information stored in the memory to the authentication server, wherein the third credential information is transmitted to the authentication server for updating the first credential information and acquiring the updated first credential information, wherein the third credential information comprises a refresh token issued by the authentication server for updating the first token,
receive the first credential information transmitted from the authentication server in a case where the transmitted third credential information is confirmed to be valid by the authentication server, and
access the Web service by using the received first credential information which is updated by using the third credential information.

2. The information processing apparatus according to claim 1,
wherein the processor is further configured to
receive information for creating a screen for the user to input authentication information used for user authentication by the management apparatus, from the management apparatus, and
create the screen based on the information for creating the screen to display the created screen on a display device.

3. A non-transitory computer readable medium storing a program causing a computer to
request a management apparatus for user authentication to acquire second credential information that is used for acquiring first credential information that is used for a Web service provided by a service providing apparatus, the second credential information indicating that a user has been authenticated to the management apparatus, wherein the first credential information comprising a first token issued by the authentication server, the second credential information comprising a second token issued by the management apparatus, and the second token comprising information for acquiring the first token to use the Web service provided by the service providing apparatus,
receive the second credential information transmitted from the management apparatus in a case where the user authentication is successful by the management apparatus,
transmit the received second credential information to the authentication server, in a case where the user authentication is successful by the management apparatus, and specific information determined only between the information processing apparatus and the authentication server
receive the first credential information transmitted from the authentication server in response to the transmission of the second credential information based on a result of verification of the transmitted second credential information and the specific information,
transmit third credential information stored in the memory to the authentication server, wherein the third credential information is transmitted to the authentication server for updating the first credential information and acquiring the updated first credential information, wherein the third credential information comprises a refresh token issued by the authentication server for updating the first token,
receive the first credential information transmitted from the authentication server in a case where the transmitted third credential information is confirmed to be valid by the authentication server,
access the Web service by using the received first credential information which is updated by using the third credential information.

* * * * *